F. M. FREDERICK.
OVERHEAD ELECTRIC RAILWAY.
APPLICATION FILED NOV. 4, 1907.

904,526.

Patented Nov. 24, 1908.
2 SHEETS—SHEET 1.

Attest.
Edgar T. Farmer.
M. P. Smith.

Inventor:—
FRANCIS M. FREDERICK.
By Higdon & Longan,
Attys.

F. M. FREDERICK.
OVERHEAD ELECTRIC RAILWAY.
APPLICATION FILED NOV. 4, 1907.

904,526.

Patented Nov. 24, 1908.
2 SHEETS—SHEET 2.

Attest.
Edgar J. Farmer.
M. C. Smith

Inventor:—
Francis M. Frederick.
By Higdon & Longan
Attys.

UNITED STATES PATENT OFFICE.

FRANCIS M. FREDERICK, OF ST. LOUIS, MISSOURI, ASSIGNOR OF ONE-EIGHTH TO FRANCIS T. MOORMANN, ONE-EIGHTH TO CHARLES H. POTH, ONE-EIGHTH TO THOMAS B. POTH, AND ONE-EIGHTH TO FRANK J. VOLLMER, OF ST. LOUIS, MISSOURI.

OVERHEAD ELECTRIC RAILWAY.

No. 904,526.     Specification of Letters Patent.     Patented Nov. 24, 1908.

Application filed November 4, 1907. Serial No. 400,727.

*To all whom it may concern:*

Be it known that I, FRANCIS M. FREDERICK, a citizen of the United States, and resident of St. Louis, Missouri, have invented certain new and useful Improvements in Overhead Electric Railways, of which the following is a specification containing a full, clear, and exact description, reference being had to the accompanying drawings, forming a part hereof.

My invention relates to an overhead electric railway, my object being to arrange a single overhead track on suitable supports, to arrange a truck for operation on said track, to suspend a car from said truck, to provide means whereby the cars are operated beneath the rail, and to provide means whereby the cars are raised and lowered relative to the overhead track.

This application should be read in connection with an application filed by me of even date herewith, Serial No. 400,726.

To the above purposes, my invention consists in certain novel features of construction and arrangement of parts, which will be hereinafter more fully set forth, pointed out in the claims, and illustrated in the accompanying drawings, in which:—

Figure 1:
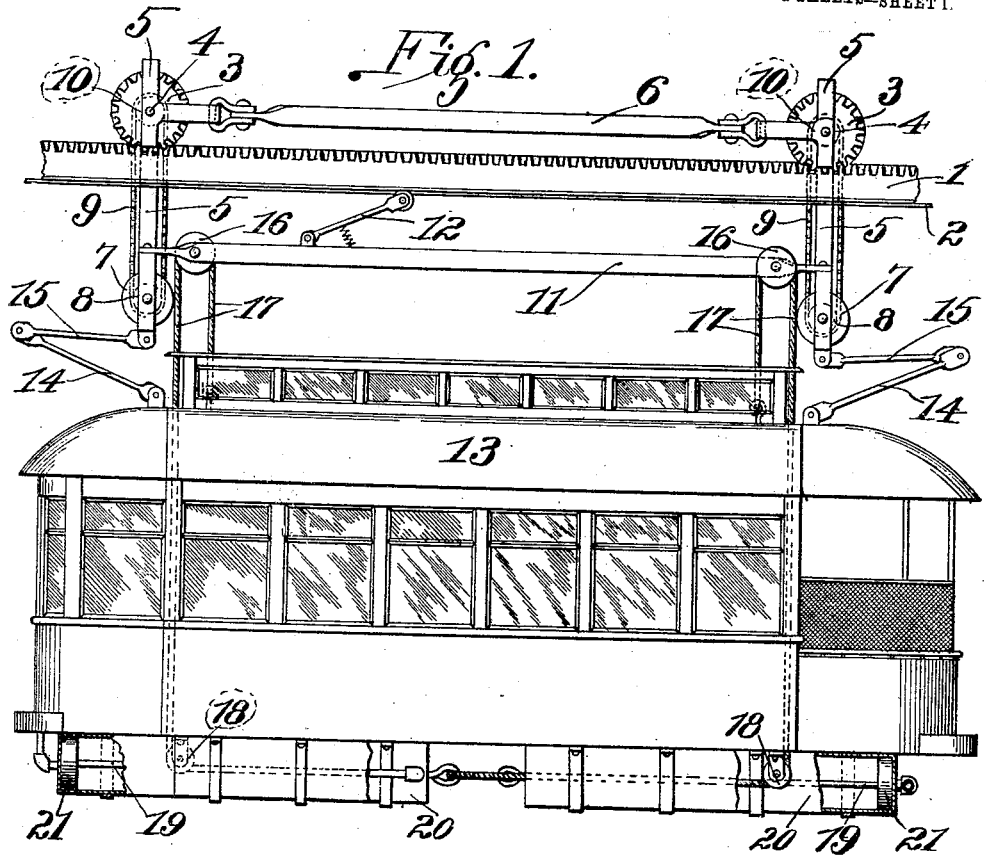
Figure 2:
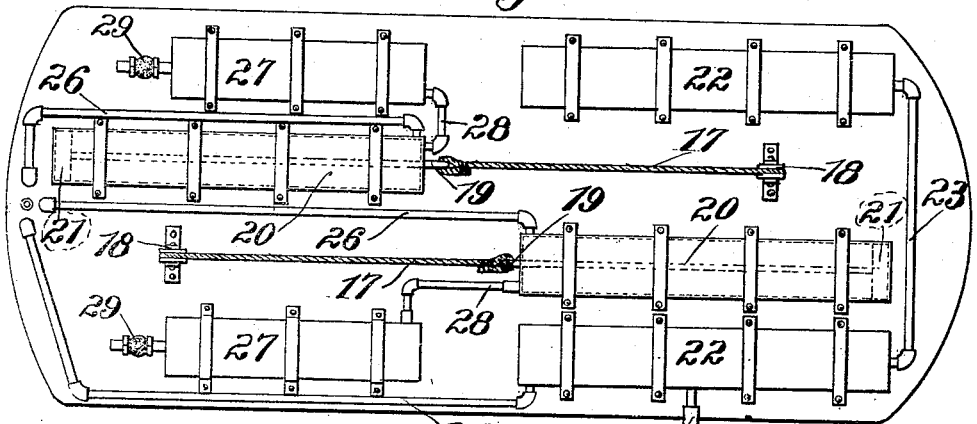
Figure 3:
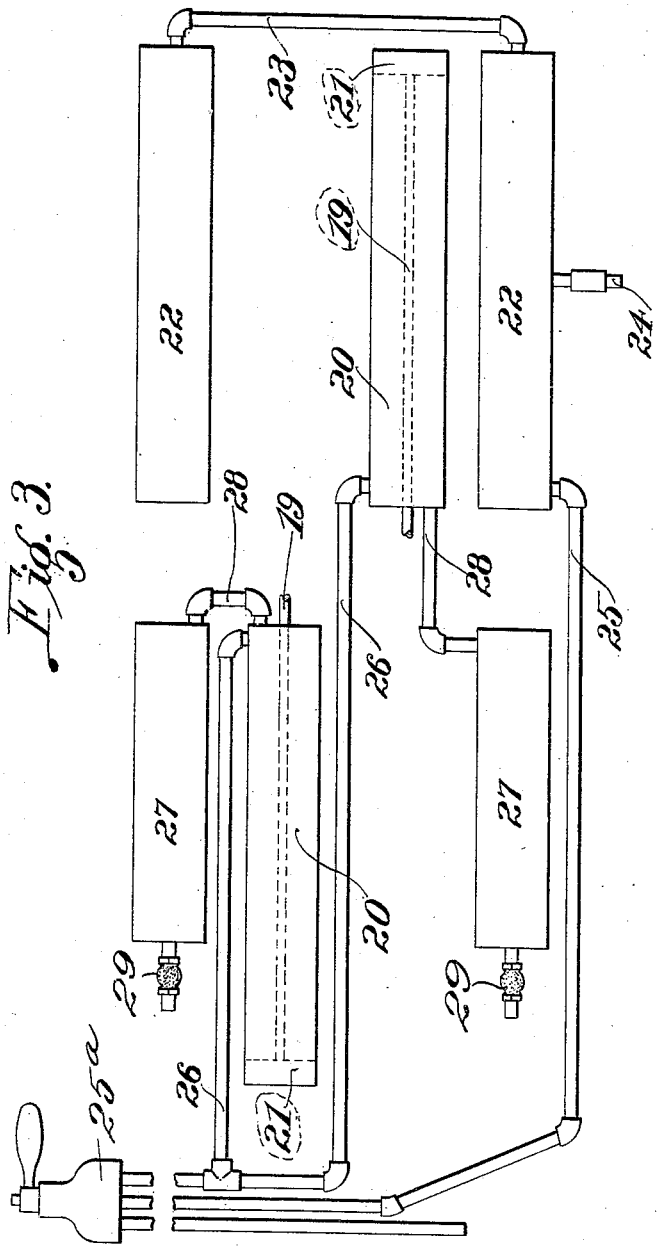

Figure 1 is a side elevation of a car and a portion of the rail of my improved overhead railway; Fig. 2 is a view looking against the under side of the car body, and showing the arrangement of the fluid pressure tanks; Fig. 3 is a diagrammatic view of the tanks and cylinders which are located on the under side of a car of my improved railway, and also showing the tubular connections between said tanks and cylinders and the brake operating valve.

Referring by numerals to the accompanying drawings, 1 designates the overhead rail, which is supported in any suitable manner a convenient distance above the ground, and arranged on the under side of said rail and insulated therefrom in any suitable manner is a conductor 2, which carries the electric current utilized in propelling the cars.

Arranged to travel on top of the rail 1 is a pair of wheels 3, the shafts and axles 4 of which are journaled in the upper ends of hangers 5, the upper portions of which hangers are connected by a longitudinally extending bar 6.

Journaled for operation in the lower ends of the hangers 5 are motors 7; and fixed on the ends of the motor shafts are sprocket wheels 8, around which pass sprocket chains 9, which extend upward and pass around sprocket wheels 10 arranged on the ends of the shafts 4.

Connecting the lower portions of the hangers 5 is a longitudinally extending bar 11, on which is mounted a trolley 12, the wheel of which rides on the conductor 2, and said trolley being electrically connected in the usual manner to the motors 7.

13 designates the car body, which is suspended from the bar 11, and pivotally connected to the top of said car body, adjacent the ends, are the lower ends of rods 14, the upper ends of which are pivoted to the outer ends of rods 15, and the opposite ends of which are pivoted to the lower ends of the hangers 5, thus providing means for conveying the current of electricity from the controller located on the car platform to the motors.

Arranged for operation on the bar 11, adjacent its ends, are grooved pulleys 16, and passing over said pulleys are heavy wire cables 17, the upper ends of which are secured in any suitable manner to the framework of the top of the car. From the pulleys 16 the central portions of the cables extend vertically downward through the car body, and around grooved pulleys 18 fixed on the under side of the car, and the ends of said cables are fixed to the ends of the piston rods 19, which operate through cylinders 20 arranged on the under side of the car, and said piston rods being carried by pistons 21 which operate in the cylinders 20.

Fixed to the under side of the car body is a pair of primary storage tanks 22, which are connected by a pipe 23, and one of said tanks being provided with an inlet valve 24.

25 designates a pipe which leads from one of the tanks 22 to an ordinary air brake operating valve 25ª located in the cab of the car, and leading from said brake valve to the forward ends of the cylinders 20 are pipes 26.

Fixed to the under side of the car body are secondary storage tanks 27, and connecting the forward ends of the cylinders 20 with said tanks are pipes 28. Automatic pressure relief valves 29 are located in the ends of the tanks 27.

When my improved railway is in operation, the car is elevated to the position seen in Fig. 1, and the trolley 12 operating on the conductor 2 delivers the electric current to the conductors which lead to the motors 7; and as said motors operate, the rotary motion is imparted to the wheels 3 which travel upon the rail 1.

The car is maintained in its elevated position by fluid pressure within the cylinders 20 in front of the pistons 21, and which fluid pressure is conveyed to said cylinders 20 from the primary tanks 22, through the pipes 25 and 26.

When it is desired to lower the car to the ground for the purpose of taking on or letting off passengers, the brake valve 25ª is operated so as to cut off the passage of fluid pressure through the pipes 25, and the exhaust is opened to allow the fluid pressure within the tanks 20 and pipes 26 to exhaust. This action reduces the pressure in the cylinders 20 in front of the pistons 21; and, as a result, said pistons and the piston rods travel forward through said cylinders, thus permitting the cables 17 to travel around the grooved wheels or pulleys 16 and 18; and, as a result, the car is lowered. During this action, a certain amount of the pressure within the cylinders 20 will be delivered to the secondary tanks 27 by means of the pipes 28, and which pressure can be utilized when the fluid pressure from the tanks 22 is again delivered to the cylinders 20 in front of the pistons 21 to elevate the car.

The pressure relief valves 29 automatically operate when the pressure within the tanks 27 rises above a given point, and thus provides for the release of the fluid pressure from the cylinders 20 into said tanks 27.

An overhead railway of my improved construction is particularly adapted for use in the streets of cities which are normally crowded with vehicles and pedestrians, and the cars can be operated at much greater speed than cars on the surface of the ground, and the danger of accidents from collisions is entirely eliminated.

I claim:—

1. The herein described overhead railway, comprising an elevated track rail, a truck arranged for operation on the rail, a car suspended from the truck, and fluid pressure actuated means carried by the car whereby the same is raised or lowered.

2. An overhead railway, comprising an elevated track rail, a truck arranged for operation on the rail, motors arranged for operation in the truck and arranged to drive the wheels thereof, a car suspended from the truck, and fluid pressure actuated means carried by the car whereby the same is raised and lowered.

3. An overhead railway, comprising an elevated track rail, a car suspended from said track rail, means whereby the car is caused to travel beneath the rail, and fluid pressure actuated means carried by the car whereby the same is raised and lowered.

4. An overhead railway, comprising an elevated track rail, a truck arranged for operation thereon, means whereby the truck is caused to travel upon the rail, cables depending from the truck, a car carried by the cables, and fluid pressure actuated means carried by the car for operating the cables to raise and lower the car.

5. The herein described overhead railway, comprising an overhead rail, an electrically driven truck arranged for operation on the rail, a car suspended from said truck, a fluid pressure storage tank carried by the car, and fluid pressure actuated means carried by the car whereby the same is raised and lowered relative to the truck.

6. The herein described overhead railway, comprising an elevated rail, a truck arranged for operation on the rail, means carried by said truck for propelling the same along the rail, a car suspended from the truck, and fluid pressure actuated means carried by the car whereby the same is raised or lowered.

In testimony whereof, I have signed my name to this specification, in presence of two subscribing witnesses.

FRANCIS M. FREDERICK.

Witnesses:
M. P. SMITH,
E. L. WALLACE.